United States Patent
Huang et al.

(10) Patent No.: US 9,089,089 B2
(45) Date of Patent: Jul. 28, 2015

(54) METHOD FOR ERECTING AND THRESHING AND COLLECTING AND HARVESTING CROP MATERIALS

(71) Applicants: Chin Piao Huang, Miauli Hsien (TW); Yuta Huang, Miauli Hsien (TW); Yufeng Huang, Miauli Hsien (TW)

(72) Inventors: Chin Piao Huang, Miauli Hsien (TW); Yuta Huang, Miauli Hsien (TW); Yufeng Huang, Miauli Hsien (TW)

( * ) Notice: Subject to any disclaimer, the term of this patent is extended or adjusted under 35 U.S.C. 154(b) by 0 days.

(21) Appl. No.: 13/744,470

(22) Filed: Jan. 18, 2013

(65) Prior Publication Data

US 2014/0075910 A1   Mar. 20, 2014

(30) Foreign Application Priority Data

Sep. 20, 2012   (TW) ............................. 101134410 A

(51) Int. Cl.
*A01D 41/00* (2006.01)
*A01D 91/04* (2006.01)

(52) U.S. Cl.
CPC ................ *A01D 41/00* (2013.01); *A01D 91/04* (2013.01)

(58) Field of Classification Search
CPC ....... A01D 57/22; A01D 23/04; A01D 25/04; A01D 43/082; A01D 45/00; A01D 65/00; A01D 45/10; A01D 65/02
USPC ............. 56/122, 98, 119, 126, 33, 14.3, 14.5, 56/13.9, 238
See application file for complete search history.

(56) References Cited

U.S. PATENT DOCUMENTS

| | | | | | |
|---|---|---|---|---|---|
| 1,942,037 | A | * | 1/1934 | Pierson | 56/14.3 |
| 2,855,058 | A | * | 10/1958 | Krier et al. | 171/42 |
| 2,862,345 | A | * | 12/1958 | Wigham | 56/98 |
| 3,075,339 | A | * | 1/1963 | Barkstrom | 56/98 |
| 3,415,044 | A | * | 12/1968 | Munson | 56/119 |
| 3,611,689 | A | * | 10/1971 | Patzlaff | 56/320 |
| 4,002,010 | A | | 1/1977 | Da Silva Passos | |
| 4,174,601 | A | * | 11/1979 | Griffin | 56/27.5 |
| 4,214,423 | A | * | 7/1980 | Dewey, Jr. | 56/130 |
| 5,058,369 | A | * | 10/1991 | Garner | 56/13.9 |
| 5,428,946 | A | * | 7/1995 | Hansen et al. | 56/27.5 |
| 6,062,011 | A | * | 5/2000 | Uhlending et al. | 56/119 |
| 2007/0209347 | A1 | * | 9/2007 | Malmros et al. | 56/126 |

FOREIGN PATENT DOCUMENTS

| | | | | | |
|---|---|---|---|---|---|
| JP | 08140414 | A | * | 6/1996 | ............ A01C 1/00 |
| RU | 2064752 | C1 | * | 8/1996 | ............ A01D 41/02 |

* cited by examiner

*Primary Examiner* — Árpád Fábián-Kovács
(74) *Attorney, Agent, or Firm* — Charles E. Baxley

(57) ABSTRACT

A method for harvesting crop materials each having a grains carrying stalk, includes erecting the stalk, cutting the stalk of the crop materials with two or more cutting blades or elements into a lower base segment carrying no grain and an upper straw segment that carries grains, discarding the lower base segment which carries no grain, threshing the upper straw segment which carries the grains for separating the grains from the upper straw segment, and collecting the grains. A blowing process is used for blowing the upper straw segment away from the grains before collecting device the grains. A determining process is used for determining a length of the lower base segment to be cut before erecting the stalk.

1 Claim, 5 Drawing Sheets

METHOD FOR ERECTING AND THRESHING AND COLLECTING AND HARVESTING CROP MATERIALS

BACKGROUND OF THE INVENTION

1. Field of the Invention

The present invention relates to a method for harvesting or threshing rice, wheat, cereals or similar crop materials, and more particularly to a method for effectively harvesting or threshing rice, wheat, cereals or similar crop materials and for effectively and suitably separating the grains from the stalk or straw of the cereals or crop materials.

2. Description of the Prior Art

Typical harvesting or threshing machines for rice, wheat, cereals or similar crop materials comprise a row of cutting blades or the like for cutting the stalk or straw of the cereals or crop materials, and a threshing drum or device disposed after or behind the cutting blades or the like for separating the grains from the stalk or straw of the cereals or crop materials.

For example, U.S. Pat. No. 4,002,010 to Da Silva Passos discloses one of the typical harvesting or threshing machines for harvesting or threshing rice, wheat, cereals or similar crop materials and the like and for separating the grains from the stalk or straw of the cereals or crop materials.

For the grain carrying standing cereals or crop materials, the stalk or straw of the cereals or crop materials may be easily cut and sent into the threshing drum or device for separating the grains from the stalk or straw of the cereals or crop materials. However, for many of the cereals or crop materials, after heavy rain or hurricane, the grain carrying parts of the cereals or crop materials may be lowered and contacted with the ground and may not be easily and quickly and readily harvested or threshed with the typical harvesting or threshing machines.

On the other hand, when the typical harvesting or threshing machines have tried to erect and harvest or thresh the grain carrying parts of the cereals or crop materials, the stalk or straw of the cereals or crop materials may not be suitably cut, and most part of the stalk or straw that carry no grains thereon will also be cut and sent into the threshing drum or device, such that the grains may not be easily and suitably separated from the stalk or straw of the cereals or crop materials.

The present invention has arisen to mitigate and/or obviate the afore-described disadvantages of the conventional harvesting or threshing machines.

SUMMARY OF THE INVENTION

The primary objective of the present invention is to provide a method for effectively harvesting or threshing the rice, wheat, cereals or similar crop materials and for effectively and suitably separating the grains from the stalk or straw of the cereals or crop materials.

The other objective of the present invention is to provide a method including preparing a cutting device having two or more cutting elements for cutting the stalk of the crop materials into one or more lower base segments that carries no grain thereon and an upper straw segment that carries grains thereon.

In accordance with one aspect of the invention, there is provided a method for harvesting crop materials each having a grains carrying stalk, comprising erecting the stalk, cutting the stalk of the crop materials into a lower base segment that carries no grain thereon and an upper straw segment that carries grains thereon, discarding the lower base segment that carries no grain thereon, threshing the upper straw segment that carries the grains thereon for separating the grains from the upper straw segment, and collecting device the grains.

A blowing process is further provided for blowing and separating the upper straw segment away from the grains before collecting device the grains. A determining process is further provided for determining a length of the lower base segment to be cut before erecting the stalk and for allowing the lower base segment to be suitably cut into the required length that carries no grain thereon and for preventing the lower base segment from affecting the harvesting or threshing operation of the grains from the upper straw segment.

A preparing process is further provided for preparing a cutting device having a first cutting element and at least one second cutting element for cutting the stalk of the crop materials into the one or more lower base segments that carries no grain thereon and the upper straw segment that carries grains thereon. An adjusting process is further provided for adjusting the second cutting element of the cutting device relative to the first cutting element.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
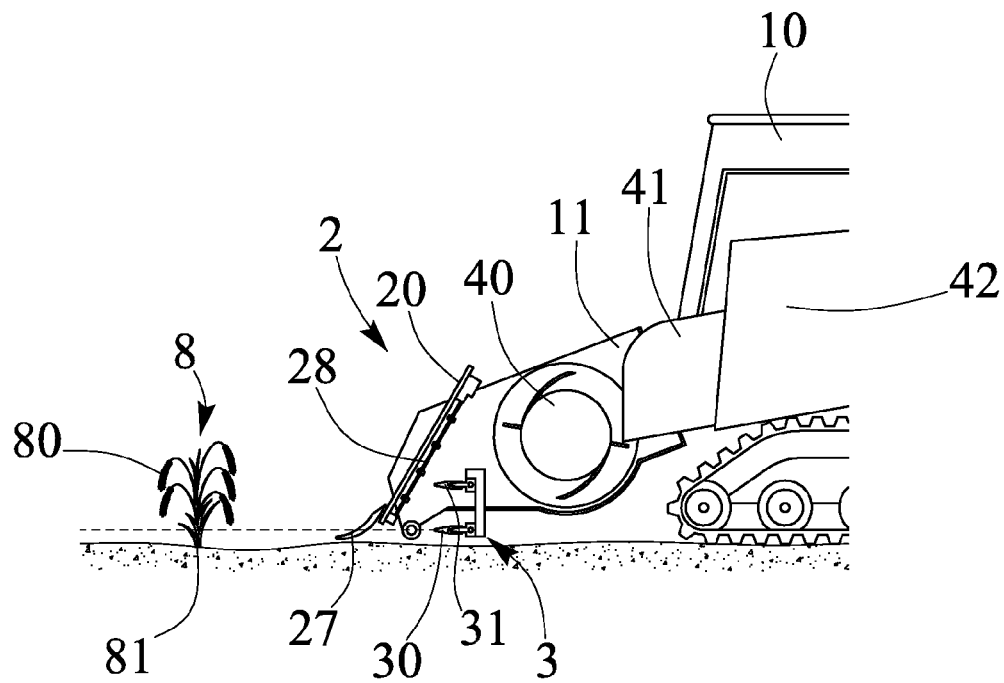
FIG. 1 is a partial side plan schematic view of a harvesting or threshing machine in accordance with the present invention.
Figure 2:
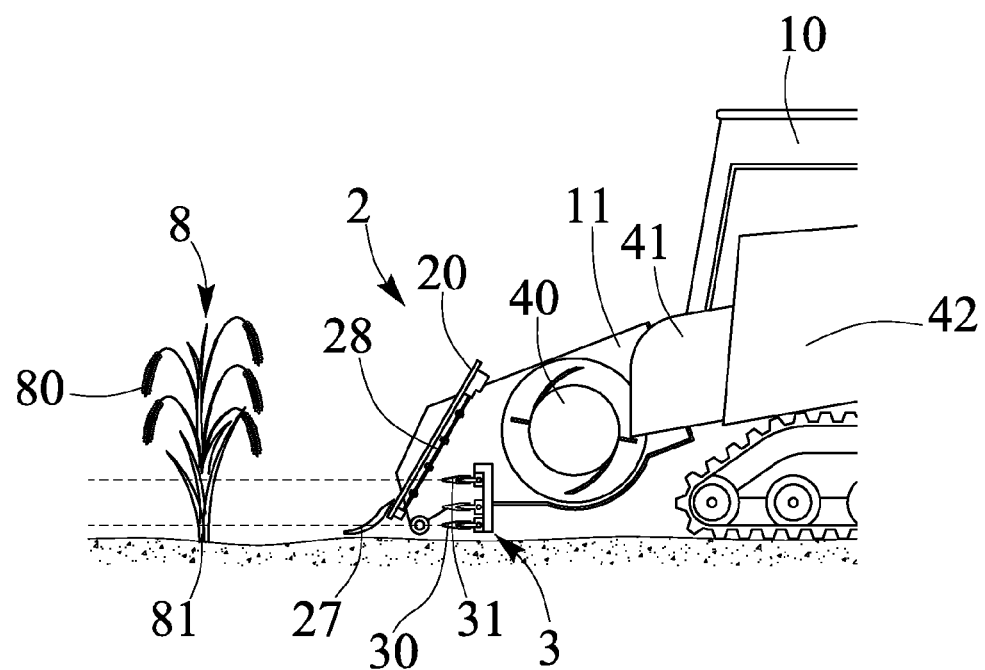
FIG. 2 is another partial side plan schematic view similar to FIG. 1, illustrating the operation of the harvesting or threshing machine.
Figure 3:
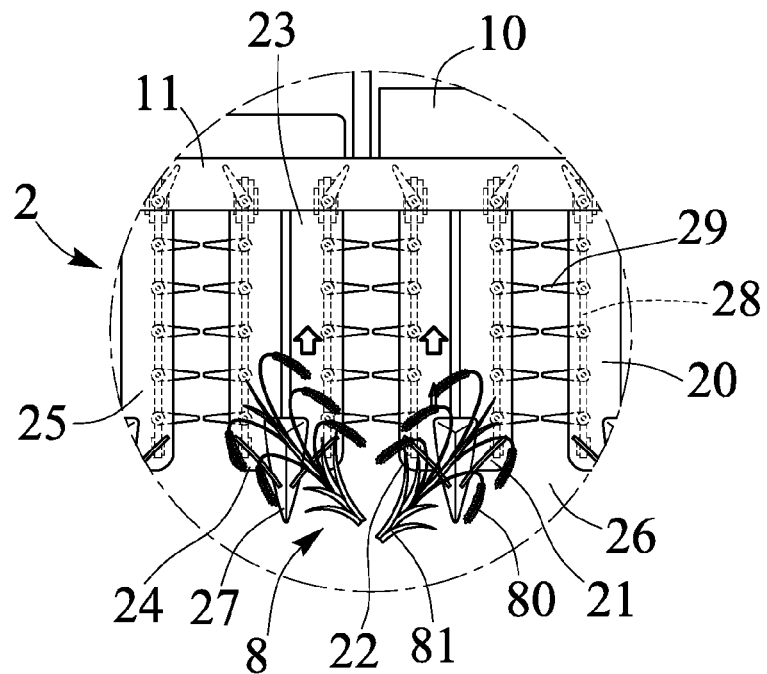
FIG. 3 is a partial top plan schematic view of the harvesting or threshing machine.
Figure 4:
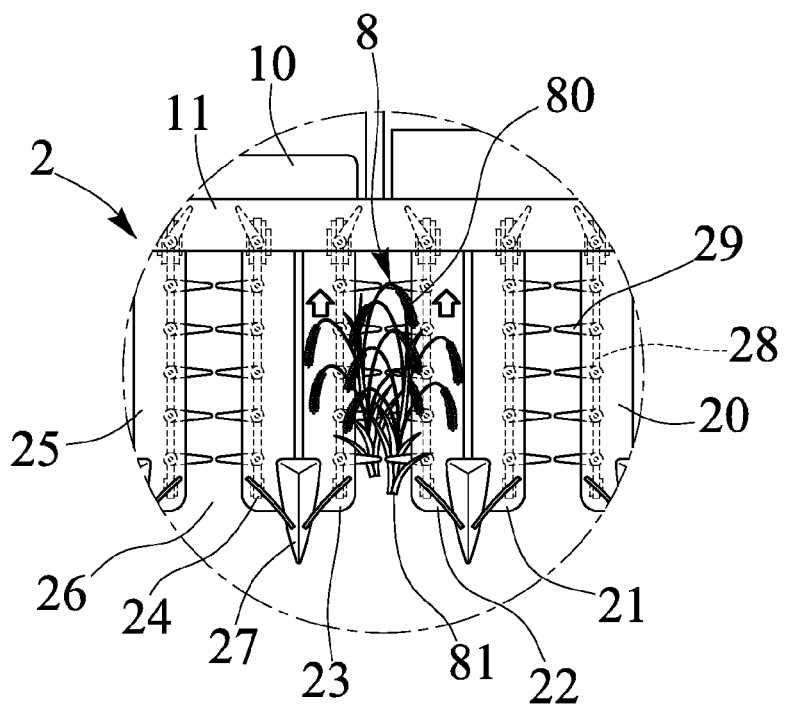
FIGS. 4, 5 are partial top plan schematic views similar to FIG. 3, illustrating the operation of the harvesting or threshing machine.
Figure 5:
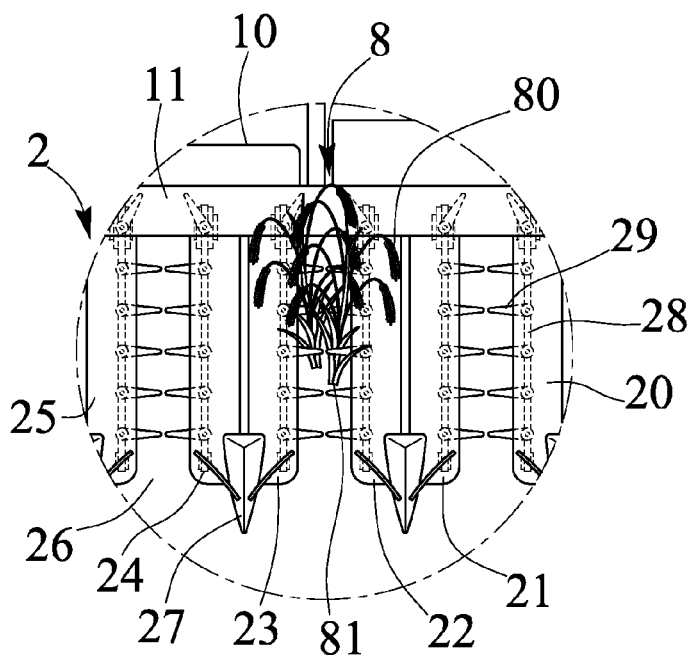

Referring to the drawings, and initially to FIGS. 1-3, a method in accordance with the present invention is provided for harvesting or threshing rice, wheat, cereals or similar crop materials, or for separating the grains 80 from the stalk 81 or straw of the cereals or crop materials 8, and comprises providing a harvesting or threshing machine including a driver cab or cockpit or chassis 10, a support or operate platform 11 disposed or supported in front of the chassis 10, an erecting station or device 2 including a number of or a number pairs of erecting or guiding bars 20, 21; 22, 23; 24, 25 attached or mounted or secured to the operate platform 11 and parallel to each other and separated or spaced from each other for forming or defining a gap or slot or channel 26 between each pair of guiding bars 20, 21; 22, 23; 24, 25; i.e., each pair of guiding bars 20, 21; 22, 23; 24, 25 include two bar members 20, 21; 22, 23; 24, 25 and having the channel 26 formed between the bar members 20, 21; 22, 23; 24, 25 of each pair of guiding bars 20, 21; 22, 23; 24, 25, best shown in FIGS. 3-5.

The erecting device 2 includes a tip or triangle guiding element 27 disposed between every two adjacent pairs of guiding bars 20, 21; 22, 23; 24, 25 for engaging with and for guiding the stalk 81 of the cereals or crop materials 8 into the channel 26 that is formed between the bar members 20, 21; 22, 23; 24, 25 of each pair of guiding bars 20, 21; 22, 23; 24, 25, best shown in FIG. 3, and further includes a conveyer belt member 28 disposed or attached or mounted or secured or engaged in each of the bar members 20, 21; 22, 23; 24, 25, and a number of jaws or pawls 29 attached or mounted or secured to the conveyer belt member 28 and extended into the channel 26 that is formed between the bar members 20, 21; 22, 23; 24, 25 of each pair of guiding bars 20, 21; 22, 23; 24, 25 for engaging with the stalk 81 of the cereals or crop materials 8 (FIGS. 4, 5) and for erecting and guiding and sending and moving the stalk 81 of the cereals or crop materials 8 into the channel 26 that is formed between the bar members 20, 21; 22, 23; 24, 25.

Figure 6:
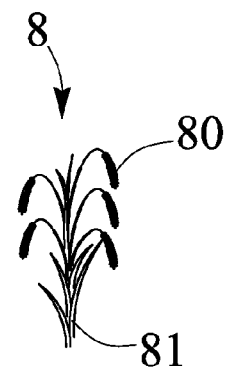
FIG. 6 is a partial plan schematic view illustrating a grain carrying standing cereal or crop material.
Figure 7:
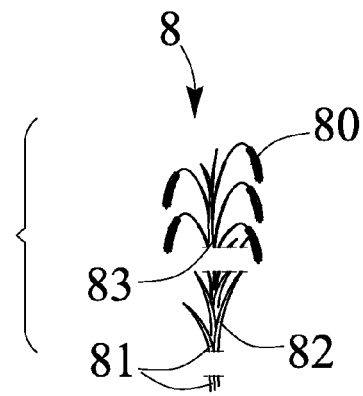
FIG. 7 is a partial exploded and plan schematic view of the grain carrying standing cereal or crop material.
Figure 8:
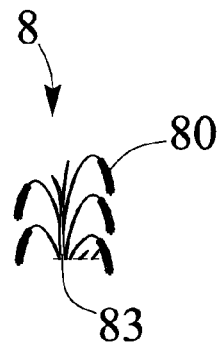
FIGS. 8, 9, 10 are partial plan schematic views similar to FIG. 6, illustrating the harvesting or threshing operation of the grains from the stalk or straw of the cereals or crop materials.

As shown in FIGS. 1-2, the harvesting or threshing machine further includes a cutting station or device 3 attached or mounted or secured to the operate platform 11 and disposed or located behind or after the erecting device 2 and having two or more cutting bars or blades or elements 30, 31 for engaging with and for cutting the stalk 81 of the cereals or crop materials 8 (FIG. 6) at two or more positions, into one or more lower or base segments 82 (FIG. 7) that carries no grain thereon, and an upper or straw segment 83 that carries the grains 80 thereon (FIG. 8). It is to be noted that the lower or the first cutting element 30 is disposed or located and arranged as close to the ground as possible for erecting and for suitably cutting the root portion of the stalk 81, and the upper or second cutting element 31 is disposed or located above the lower or the first cutting element 30 and movable or adjustable relative to the lower or the first cutting element 30 (FIGS. 1, 2) for suitably cutting the lower or base segment 82 (FIG. 7) that carries no grain from the stalk 81.

It is to be noted that the upper or second cutting element 31 is movable or adjustable relative to the lower or the first cutting element 30 (FIGS. 1, 2) according to the length of the lower or base segment 82 that carries no grain thereon for allowing as long as the lower or base segment 82 that carries no grain thereon to be cut, and leaving only the upper or straw segment 83 that carries the grains 80 thereon (FIG. 8) to be further treated. Referring again to FIGS. 1 and 2, the harvesting or threshing machine further includes a threshing or crushing or beating station or cylinder or device 40 attached or mounted or secured to the operate platform 11 and disposed or located behind or after the cutting station or device 3 for receiving and treating only the upper or straw segment 83 that carries the grains 80 thereon.

Figure 9:
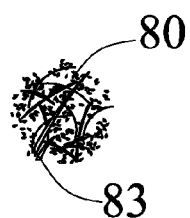
Figure 10:
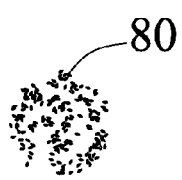

For example, the threshing or crushing or beating station or device 40 may be provided for threshing or crushing or beating the upper or straw segment 83 that carries the grains 80 thereon and for suitably separating the grains 80 from the upper or straw segment 83 of the stalk 81 (FIG. 9). A conveying or blowing station or device 41 is also attached or mounted or secured to the operate platform 11 and disposed or located behind or after the threshing or crushing or beating station or device 40 for blowing and removing the upper or straw segment 83 of the stalk 81, and a threshing or crushing or beating or collecting station or device 42 is also attached or mounted or secured to the operate platform 11 and disposed or located behind or after the conveying or blowing station or device 41 for collecting the grains 80 (FIG. 10), for example. The threshing or crushing or beating station or device 40 and the conveying or blowing station or device 41 and the threshing or crushing or beating or collecting station or device 42 are typical will not be described in further details.

Figure 11:
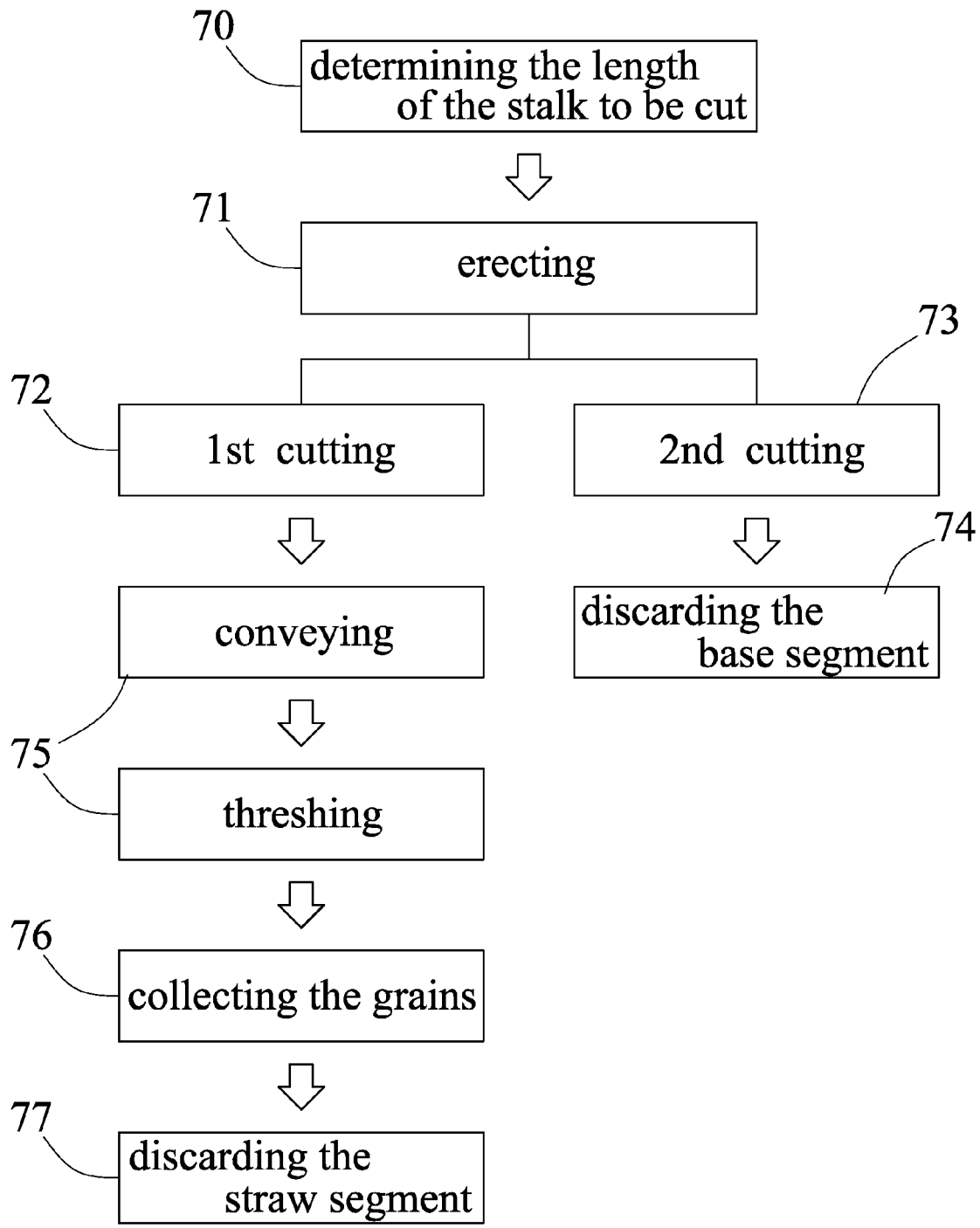
FIG. 11 is a block diagram illustrating the harvesting or threshing operation of the harvesting or threshing machine.

In operation, as shown in FIG. 11, the length of the lower or base segment 82 that carries no grain thereon is first measured and/or determined in the first process 70, and the upper or second cutting element 31 is moved or adjusted relative to the lower or the first cutting element 30 according to the length of the lower or base segment 82 that carries no grain thereon for allowing as long as the lower or base segment 82 that carries no grain thereon to be cut, and for leaving only the upper or straw segment 83 that carries the grains 80 thereon to be further treated. The tip or triangle guiding element 27 and/or the jaws or pawls 29 and/or the bar members 20, 21; 22, 23; 24, 25 of each pair of guiding bars 20, 21; 22, 23; 24, 25 of the erecting device 2 may then be used to erect and guide and send and move the stalk 81 of the cereals or crop materials 8 into the channel 26 that is formed between the bar members 20, 21; 22, 23; 24, 25 in the process 71. The erecting and guiding and sending and moving process 71 of the stalk 81 may also be conducted before the measuring and/or determining process 70.

The cutting elements 30, 31 of the cutting station or device 3 may then be used to cut simultaneously or one after the other, the stalk 81 of the cereals or crop materials 8 (FIG. 6) into the lower or base segment 82 (FIG. 7) that carries no grain thereon, and the upper or straw segment 83 that carries the grains 80 thereon (FIG. 8) in the processes 72, 73, and for allowing the lower or base segment 82 to be separated and discarded in the process 74. The upper or straw segment 83 that carries the grains 80 thereon (FIG. 8) will then be conveyed and/or threshed or crushed or beaten with the threshing or crushing or beating station or device 40 in the process 75 for separating the grains 80 from the upper or straw segment 83 of the stalk 81 (FIG. 9), and the conveying or blowing station or device 41 and/or the threshing or crushing or beating or collecting station or device 42 may then be used to blow and remove the upper or straw segment 83 of the stalk 81 from the grains 80 and/or for collecting the grains 80 in the process 76, and for allowing the upper or straw segment 83 to be separated and discarded in the process 77.

It is to be noted that the stalk 81 of the cereals or crop materials 8 may be cut with the two or more cutting bars or blades or elements 30, 31 of the cutting station or device 3 into at least the lower or base segment 82 that carries no grain thereon, and the upper or straw segment 83 that carries the grains 80 thereon, in which the lower or base segment 82 that carries no grain thereon will be separated and discarded and will not be sent to the threshing or crushing or beating station or device 40, and only the upper or straw segment 83 that carries the grains 80 thereon will be sent to the threshing or crushing or beating station or device 40 and/or the conveying or blowing station or device 41 and/or the threshing or crushing or beating or collecting station or device 42 for being further treated, such that the grains 80 may be easily and quickly and readily separated from the upper or straw segment 83 of the cereals or crop materials 8 and may be effectively and suitably harvested or threshed with the harvesting or threshing machine in accordance with the present invention.

Figure 12:
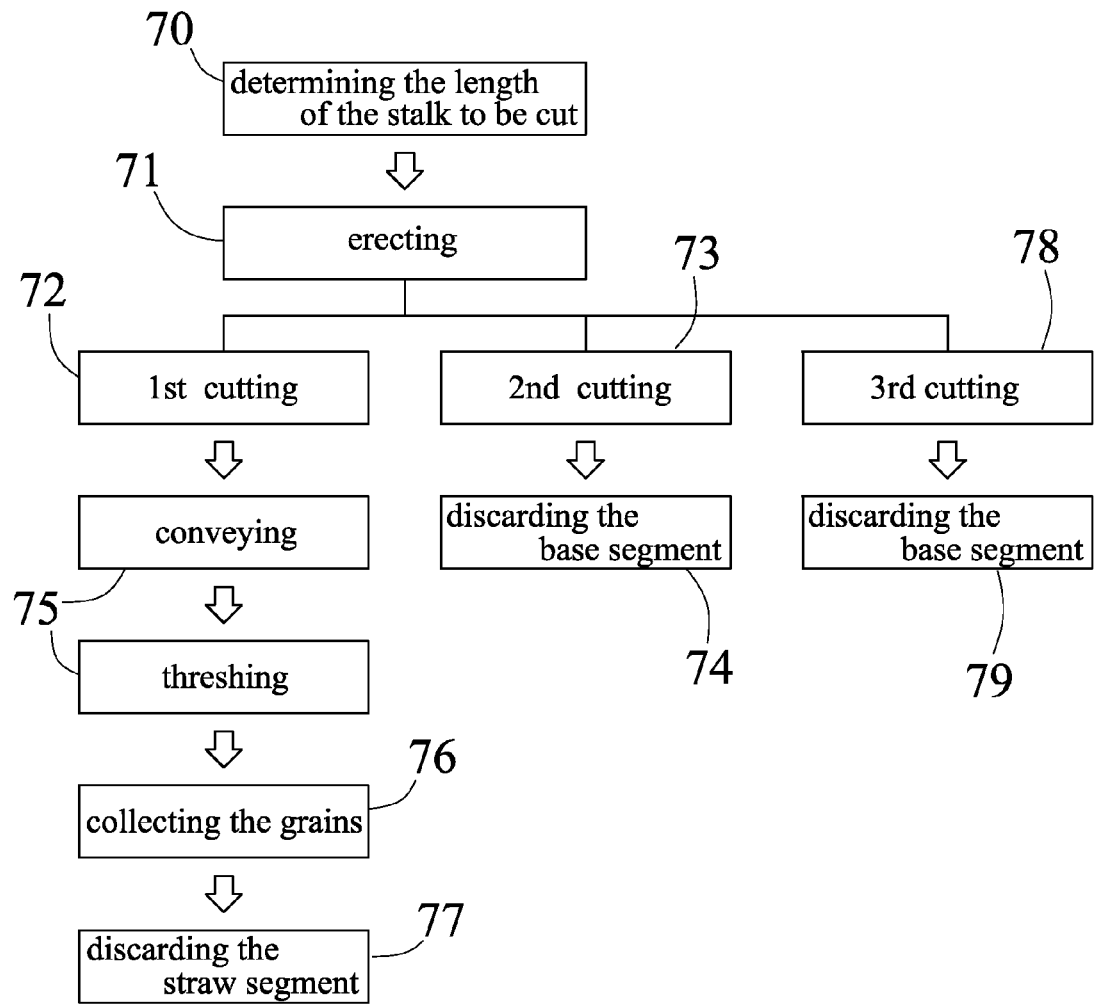
FIG. 12 is another block diagram similar to FIG. 11, illustrating the harvesting or threshing operation of the harvesting or threshing machine.

As shown in FIG. 12, another or a third cutting process 78 may further be provided for further cutting the stalk 81 of the cereals or crop materials 8 into more lower or base segments or the like that carries no grain thereon and that will not be sent to the threshing or crushing or beating station or device 40 and the conveying or blowing station or device 41 and the threshing or crushing or beating or collecting station or device 42 and that will not affect the harvesting or threshing operation of the grains from the upper or straw segment 83 that carries the grains 80 thereon, the cutting station or device 3 may use the upper or second cutting element 31 or a further cutting element to conduct the third cutting operation 78 of the stalk 81, and for allowing the lower or base segments to be separated and discarded in the process 79.

Accordingly, the harvesting or threshing machine in accordance with the present invention includes an arrangement for effectively harvesting or threshing the rice, wheat, cereals or similar crop materials and for effectively and suitably separating the grains from the stalk or straw of the cereals or crop materials.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for harvesting crop materials each having a grains carrying stalk, comprising:

preparing an erecting device for erecting the stalk, said erecting device including a plurality pairs of guiding bars attached to said platform, and each pair of guiding bars including two bar members separated from each other for forming a channel between said bar members, preparing a triangle guiding element disposed between every two adjacent pairs of guiding bars for engaging with and for guiding a stalk of the crop materials into said channel that is formed between said bar members of each pair of guiding bars, preparing a conveyer belt member disposed in each of said bar members, and a plurality of pawls attached to said conveyer belt member and extended into said channel that is formed between said bar members of each pair of guiding bars for engaging with the stalk and for guiding and sending the stalk of the crop materials into said channel that is formed between said bar members, preparing a cutting device having a first cutting element and at least one second cutting element for cutting the stalk of the crop materials into a lower base segment that carries no grain thereon and an upper straw segment that carries grains thereon, discarding the lower base segment that carries no grain thereon, threshing the upper straw segment that carries the grains thereon for separating the grains from the upper straw segment, and collecting the grains.

\* \* \* \* \*